(12) United States Patent
Kavanaugh (10) Patent No.: US 7,805,881 B2
(45) Date of Patent: Oct. 5, 2010

(54) BEAD ATTACHMENT

(76) Inventor: Patrick John Kavanaugh, E3275 Benrud La., Eau Claire, WI (US) 54701-8584

(*) Notice: Subject to any disclaimer, the term of this patent is extended or adjusted under 35 U.S.C. 154(b) by 375 days.

(21) Appl. No.: 11/803,258

(22) Filed: May 14, 2007

(65) Prior Publication Data

US 2008/0282599 A1 Nov. 20, 2008

(51) Int. Cl.
*A01K 95/00* (2006.01)
*A01K 91/06* (2006.01)
*A44C 25/00* (2006.01)

(52) U.S. Cl. ............... 43/44.91; 43/44.87; 43/44.89; 43/44.9; 43/44.92; 24/130; 24/460; 63/38

(58) Field of Classification Search ............ 43/44.89, 43/44.9, 44.91, 44.92, 44.95, 44.87, 43.1, 43/57.1, 25.2; 24/460, 462, 30.5 R, 30.5 P, 24/30.5 S; 220/837, 839, 833–836, 780, 220/810, 816; 63/38

See application file for complete search history.

(56) References Cited

U.S. PATENT DOCUMENTS

| | | | | | |
|---|---|---|---|---|---|
| 419,574 | A | * | 1/1890 | Vasseur | 43/44.92 |
| 676,724 | A | * | 6/1901 | McCargar et al. | 43/44.95 |
| 822,694 | A | * | 6/1906 | Shepherd | 43/44.89 |
| 1,098,018 | A | * | 5/1914 | Cook | 43/44.91 |
| 1,176,631 | A | * | 3/1916 | Wells | 43/44.92 |
| 1,240,043 | A | * | 9/1917 | Gregory et al. | 43/44.92 |
| 2,077,184 | A | * | 4/1937 | Rader et al. | 43/44.87 |
| 2,351,558 | A | * | 6/1944 | Sykora | 43/44.9 |
| 2,395,892 | A | * | 3/1946 | Lontz | 43/44.91 |
| 2,406,252 | A | * | 8/1946 | Potter | 43/44.9 |
| 2,428,497 | A | * | 10/1947 | Meek | 43/44.89 |
| 2,481,346 | A | * | 9/1949 | Rigby | 43/44.95 |
| 2,741,067 | A | | 4/1956 | Cox | |
| 2,754,616 | A | * | 7/1956 | Law | 43/44.91 |
| 2,791,060 | A | * | 5/1957 | Kender | 43/44.9 |
| 2,904,924 | A | * | 9/1959 | Tashiro | 43/44.89 |
| 2,983,068 | A | * | 5/1961 | Grayson | 43/44.89 |
| 3,019,545 | A | * | 2/1962 | Long | 43/44.89 |
| 3,019,546 | A | * | 2/1962 | Hansen | 43/44.91 |
| 3,104,487 | A | * | 9/1963 | Havel | 43/44.9 |
| 3,107,451 | A | * | 10/1963 | Sitzler et al. | 43/44.92 |
| 3,173,222 | A | * | 3/1965 | Hansen | 43/44.91 |
| 3,197,914 | A | * | 8/1965 | Beverly | 43/44.95 |

(Continued)

FOREIGN PATENT DOCUMENTS

EP 105674 A2 * 4/1984

(Continued)

*Primary Examiner*—Darren W Ark
(74) *Attorney, Agent, or Firm*—Westman, Champlin & Kelly, P.A.

(57) ABSTRACT

A device made of a thermoplastic material having two portions connected together with a web or hinge. A first portion forms a main body and the second portion forms a lid or cover. When the lid is aligned and closed onto the main body, the shape of the unitary device may be spherical, elliptical or another shape. The main body allows for one or more lines or strings to rest within a channel formed in the main body parallel to a pivot axis of the hinge so that when the lid is closed into the main body the strings are trapped within the channel of the main body by the lid.

15 Claims, 11 Drawing Sheets

U.S. PATENT DOCUMENTS

| | | | | |
|---|---|---|---|---|
| 3,241,262 | A * | 3/1966 | Beverly | 43/44.95 |
| 3,280,870 | A * | 10/1966 | Bundy | 206/526 |
| 3,293,792 | A * | 12/1966 | Bittaker, Jr. | 43/44.95 |
| 3,395,788 | A * | 8/1968 | Gill | 43/54.1 |
| 3,533,184 | A | 10/1970 | Kerr | |
| 3,571,861 | A * | 3/1971 | Olson | 24/30.5 P |
| 3,638,347 | A * | 2/1972 | Kochevar | 43/44.89 |
| 4,006,764 | A * | 2/1977 | Yamamoto et al. | 383/63 |
| 4,015,361 | A * | 4/1977 | O'Reilly et al. | 43/57.1 |
| 4,145,833 | A * | 3/1979 | Ratte | 43/44.89 |
| 4,194,655 | A * | 3/1980 | Tillotson | 224/191 |
| 4,200,190 | A | 4/1980 | Tyson | |
| 4,426,804 | A * | 1/1984 | Hutson | 43/44.95 |
| 4,459,775 | A * | 7/1984 | Ratte | 43/44.91 |
| 4,478,381 | A | 10/1984 | Pittion et al. | |
| 4,534,089 | A * | 8/1985 | Swan | 24/30.5 P |
| 4,563,831 | A * | 1/1986 | Gibney | 43/44.91 |
| 4,662,038 | A * | 5/1987 | Walker | 24/462 |
| 4,780,981 | A * | 11/1988 | Hayward et al. | 43/44.89 |
| 4,796,300 | A * | 1/1989 | Branson | 24/462 |
| 4,864,767 | A * | 9/1989 | Drosdak | 43/44.89 |
| 4,893,433 | A * | 1/1990 | Scheffler et al. | 43/44.92 |
| 4,942,271 | A * | 7/1990 | Corsi et al. | 220/835 |
| 4,949,645 | A * | 8/1990 | Hayward et al. | 43/44.89 |
| 4,964,236 | A * | 10/1990 | Adams | 43/44.92 |
| 5,203,107 | A | 4/1993 | O'Brien et al. | |
| 5,241,776 | A * | 9/1993 | Adams | 43/44.92 |
| 5,305,534 | A | 4/1994 | Lazich | |
| 5,369,847 | A * | 12/1994 | Naya et al. | 24/30.5 R |
| 5,377,443 | A * | 1/1995 | Giray et al. | 43/44.92 |
| 5,417,008 | A * | 5/1995 | Smith | 43/44.95 |
| 5,444,937 | A * | 8/1995 | Borner | 43/44.95 |
| 5,457,909 | A * | 10/1995 | Graves | 43/44.91 |
| 5,575,104 | A * | 11/1996 | Wilding | 43/25.2 |
| D385,061 | S * | 10/1997 | Malik | D28/42 |
| 5,713,152 | A * | 2/1998 | Domack | 43/44.95 |
| 5,794,315 | A * | 8/1998 | Crabtree et al. | 24/30.5 R |
| 5,899,334 | A * | 5/1999 | Domerchie et al. | 206/470 |
| 6,061,941 | A * | 5/2000 | Verret | 40/603 |
| 6,125,574 | A | 10/2000 | Ganaja et al. | |
| 6,301,825 | B1 * | 10/2001 | Doreian | 43/57.1 |
| 6,508,098 | B2 * | 1/2003 | Ratte | 43/44.89 |
| 6,513,278 | B1 | 2/2003 | Jorgensen | |
| 6,550,179 | B1 * | 4/2003 | Seay | 43/44.91 |
| 6,602,101 | B2 * | 8/2003 | deDoes | 441/1 |
| 6,606,814 | B1 * | 8/2003 | Weaver | 43/25.2 |
| 6,637,080 | B2 * | 10/2003 | Verret | 24/462 |
| 6,857,219 | B2 * | 2/2005 | Jang | 43/25.2 |
| 6,931,786 | B1 * | 8/2005 | Bennett | 43/44.89 |
| 6,996,879 | B1 * | 2/2006 | Savicki | 24/30.5 R |
| 6,996,931 | B1 * | 2/2006 | Ratte | 43/44.89 |
| 7,007,507 | B2 * | 3/2006 | Enevoldsen | 63/38 |
| 7,069,687 | B2 * | 7/2006 | Jang | 43/57.1 |
| 7,080,477 | B2 * | 7/2006 | Shannon | 43/57.1 |
| 7,162,830 | B2 * | 1/2007 | Sims | 43/44.9 |
| 7,204,388 | B2 * | 4/2007 | Galland et al. | 220/835 |
| 7,481,020 | B1 * | 1/2009 | Ruzicka | 43/44.91 |
| 7,490,433 | B2 * | 2/2009 | Schoenike | 43/44.91 |
| 7,565,763 | B1 * | 7/2009 | Ruzicka | 43/44.91 |
| 7,614,179 | B2 * | 11/2009 | Kavanaugh | 43/44.91 |
| 7,665,192 | B2 * | 2/2010 | Blythe et al. | 24/30.5 R |
| 2002/0178646 | A1 * | 12/2002 | Ratte | 43/44.9 |
| 2003/0135959 | A1 * | 7/2003 | Wales | 24/30.5 R |
| 2004/0045134 | A1 * | 3/2004 | Savicki | 24/30.5 R |
| 2004/0250462 | A1 * | 12/2004 | Trebil | 43/25.2 |
| 2005/0011109 | A1 * | 1/2005 | Valentyne | 43/89 |
| 2005/0091909 | B2 * | 5/2005 | Hanes | 43/44.87 |
| 2005/0160657 | A1 * | 7/2005 | Dodge | 43/25.2 |
| 2005/0178042 | A1 * | 8/2005 | Dodge | 43/25.2 |
| 2005/0279011 | A1 * | 12/2005 | Schoenike | 43/44.91 |
| 2006/0162233 | A1 * | 7/2006 | Hueso Pajares | 43/44.91 |
| 2007/0089354 | A1 * | 4/2007 | Franolic | 43/44.91 |
| 2007/0095848 | A1 * | 5/2007 | Galland et al. | 220/839 |
| 2007/0157505 | A1 * | 7/2007 | Dodge | 43/25.2 |
| 2008/0034640 | A1 * | 2/2008 | Naerheim et al. | 43/44.89 |
| 2008/0256760 | A1 * | 10/2008 | Kavanaugh | 43/44.91 |
| 2008/0283539 | A1 * | 11/2008 | Salice | 220/839 |
| 2008/0295386 | A1 * | 12/2008 | Hudson | 43/44.91 |
| 2009/0013585 | A1 * | 1/2009 | Acworth et al. | 43/44.89 |

FOREIGN PATENT DOCUMENTS

| | | | | |
|---|---|---|---|---|
| EP | 190932 | A1 * | 8/1986 | |
| EP | 1358796 | A1 * | 11/2003 | |
| FR | 2613906 | A1 * | 10/1988 | |
| FR | 2708175 | A1 * | 2/1995 | |
| GB | 2139861 | A * | 11/1984 | |
| GB | 2157932 | A * | 11/1985 | |
| GB | 2170682 | A * | 8/1986 | |
| GB | 2173982 | A * | 10/1986 | |
| GB | 2191373 | A * | 12/1987 | |
| GB | 2196221 | A * | 4/1988 | |
| GB | 2203621 | A * | 10/1988 | |
| GB | 2330755 | A * | 5/1999 | |
| JP | 07308144 | A * | 11/1995 | |
| JP | 08228652 | A * | 9/1996 | |
| JP | 08266201 | A * | 10/1996 | |
| JP | 09299002 | A * | 11/1997 | |
| JP | 10094354 | A * | 4/1998 | |
| JP | 10210907 | A * | 8/1998 | |
| JP | 11089493 | A * | 4/1999 | |
| JP | 11289940 | A * | 10/1999 | |
| JP | 2000069892 | A * | 3/2000 | |
| JP | 2001086910 | A * | 4/2001 | |
| JP | 2001120136 | A * | 5/2001 | |
| JP | 2001269101 | A * | 10/2001 | |
| JP | 2001269102 | A * | 10/2001 | |
| JP | 2001275536 | A * | 10/2001 | |
| JP | 2001275537 | A * | 10/2001 | |
| JP | 2002034410 | A * | 2/2002 | |
| JP | 2002065133 | A * | 3/2002 | |
| JP | 2002084948 | A * | 3/2002 | |
| JP | 2002335838 | A * | 11/2002 | |
| JP | 2003189774 | A * | 7/2003 | |
| JP | 2003299428 | A * | 10/2003 | |
| JP | 2005229940 | A * | 9/2005 | |
| JP | 2007082494 | A * | 4/2007 | |

* cited by examiner

BEAD ATTACHMENT

BACKGROUND

1. Field of the Invention

This invention relates generally to a device attachable to a string, rope, wire, cord or other flexible line. More particularly, the attachment device of the present invention is attachable to and will remain on a string without having to thread the string through a hole in the device. The device may be quickly attached to a string by snapping together a top and bottom portion of the device to form the unitary device locked on the string. The device can be used to, for example, mark a location on the string, adorn the string as a decorative bead, or used to bundle two or more strings together by locking a single device on two or more stings.

2. Background of the Invention

A bead typically has a spherical shape with a hole extending through a central axis of the bead. The end of a string may be pushed or threaded through the hole in the bead so that the bead is affixed to the string but can slip along the string. A bead of this design is put on a string by pushing the string through the hole in the bead. In order to be able to affix the bead on the string, the end of the string must be free of knots or restrictions and cannot be tied to some other device. In other words, if knots or obstructions are on the string that portion or end of the string will not be able to be pushed through the hole in the bead. The user may have no alternative but to cut the string so that the string can go into the hole in the bead. The typical bead also typically has a hole in the bead larger than the diameter of the string so the string is more easily pushed through the hole.

Over the years, various devices have been constructed for attachment to a string through a fixed hole in the device. In many situations a user may wish to rig a string with one or more objects attached to the ends of the string. While using the rigged string the user may also wish to attach an additional object to the string without removing the objects already affixed on either end of the string.

For example, a user may wish to add a bead to a string of beads without removing any of the beads that are already threaded on the string. The bead to be added may, for example, be of a different color so as to compliment the beads presently on the string. Preferably, the additional bead should be added to the string without removing any of the beads presently on the string. To add a bead to the middle of a string of beads would require half the beads to be removed, the new bead could be added and all the beads that were removed would have to be strung back on the string of beads again.

Devices have been described in an attempt to allow for quick attachment to a string. For example, U.S. Pat. No. 6,931,786 describes a fisherman sinker-bobber; U.S. Pat. No. 5,203,107 describes a fishing line limit assembly; and U.S. Pat. No. 5,377,443 describes glass fishing weights. Although these devices may be attached to a string or line without threading through a hole, the disadvantages of these devices and the advantages of the present invention should become apparent to those skilled in the art from a review of the description of the invention.

SUMMARY

The device of the present invention quickly attaches to a string without having to thread the end of the string through the device. The device has a first half or main body, a second half, lid or cover, and a hinge that interconnects the main body to the lid. The main body has a channel that extends into the main body from an outer surface of the main body. A first end of the channel extends into the main body at a first outer portion of the main body and a second end of the channel extends into the main body at a second outer portion of the main body. At least a portion of the channel has concave sidewalls. The lid includes a wedge extending from a portion of the lid, wherein a shape of a portion of the wedge and the concave sidewall of the main body are congruent. When the lid is aligned and engaged with the main body, the wedge engages with the main body in a portion of the channel. When engaged, the wedge interlocks with the channel. Another aspect is that a bottom of the channel may align with and extend through a central axis of the main body. Another aspect is that an outermost width of the device does not exceed 0.250 inches. A device having this outermost width is suitable for use as a fishing line stop.

The hinge may include a pivot axis that aligns parallel with the channel and may also have a shape of an outer surface of the hinge that is congruent with a shape of an adjacent surface of the device when the wedge engages with the main body. When the main body and lid are coupled or snapped together, the inner portion of the hinge is contained and concealed within the unitary structure formed by the main body and lid.

Those skilled in the art will appreciate that the device is particularly well suited for attachment to a string and configurable as decorative beads or alternatively as a bobber stop on a fishing line. The beads can be added to any location on the string without needing to remove beads already on the string. The user simply positions the main body at a desired location on the string and then closes the lid onto the main body, snapping them together. A unitary bead is then created on the string without needing to remove beads already on a string of beads. When the body and lid are snapped together, the bead has the appearance of a solid, unitary bead.

A hole, channel or aperture formed in the center of the bead when it is closed may be designed to be smaller so as to fit tightly on the string, thereby reducing the likelihood that the bead can slide on the string. It may be desirable to have a bead on a string that does not slide on the string so that other beads on the string are stopped from sliding past a point on the string. Alternatively, the user may tie a knot in the string to keep the bead from slipping past a certain point on the string, similar to, for example, a string of pearls. By sizing the channel so that the string fits tightly within the channel, the user does not have to tie a knot in the string, although a friction fit on the string would allow the bead to be forced or pulled along the string to a new location.

Further, the device can be made small and very streamlined so that when added to a fishing line, for example, it can be used as an attractant or as a bobber stop. When used as a bobber stop the streamline shape allows the device to be attached at any place along the fishing line and when the line is reeled up the device will slide through the eye loops in the fishing pole and into the fishing real.

Without limitation, the main body may have a spherical shape, an elongated shape or other suitable shape, and may be injection molded of a thermoplastic material, a buoyant material, or other suitable material. Other features of the invention are further described in the detailed description, claims, and accompanying drawings in which like numerals in the several views refer to corresponding parts.

DETAILED DESCRIPTION

Those skilled in the art will appreciate that the embodiments of the present invention described herein are exemplary and modifications may be made without departing from the intended scope of the invention. For example, without any limitation intended, although the bead of the present invention is shown in the drawings as being elliptical or spherical, those skilled in the art will appreciate that the bead of the present invention includes alternative shapes and sizes without departing from the intended scope of the invention.

Figure 1:
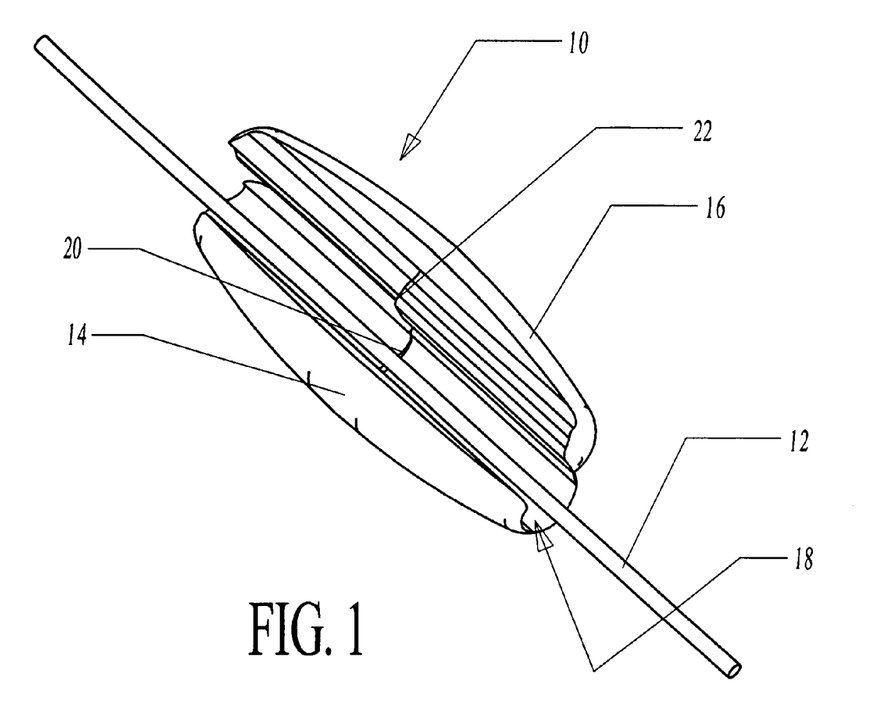
FIG. 1 is a perspective view of an elongated bead of the present invention attached to a string having a lid shown in the open position.
Figure 2:
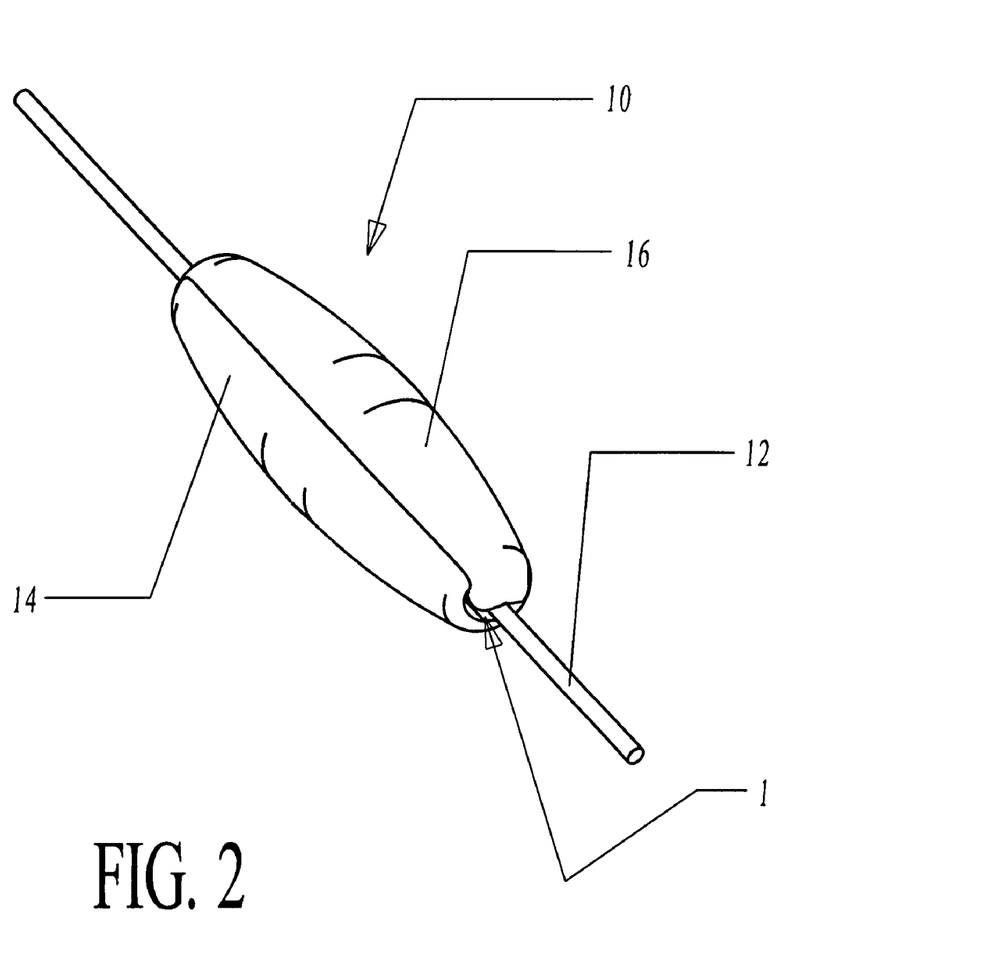
FIG. 2 is a perspective view of the bead of the type as shown in FIG. 1 with the lid in the closed position.

Referring first to FIGS. 1 and 2, a bead 10 of the present invention is shown having a string 12 positioned within the bead 10. The bead 10 includes a main body 14 and lid 16. A channel 18 is formed in the main body 14 of the bead 10 and is suitable for receiving the string 12 within the channel 18. The channel 18 includes an offset 20 and the interior of the lid 16 likewise includes an offset 22 that is shaped to conform to the offset 20 of the channel 18. The string 12 is cradled in the channel 18 such that when the lid 16 is closed on the main body 14, the longitudinal surface of the channel and the longitudinal surface of the interior of the lid 16 press against the string 12 in opposite directions, thereby fixing the string in place with respect to the bead 10. When the lid 16 is closed on the main member 14, the channel 18 is generally aligned with a central axis of the bead 10, such that the bead 10 is equally balanced on the string 12 so that the bead 10 does not hang disproportionately on the string 12. Further, when the lid 16 is closed, the external surface of the bead 10 is generally smooth and without abrupt contours that easily catch or snag on adjacent objects.

Figure 3:
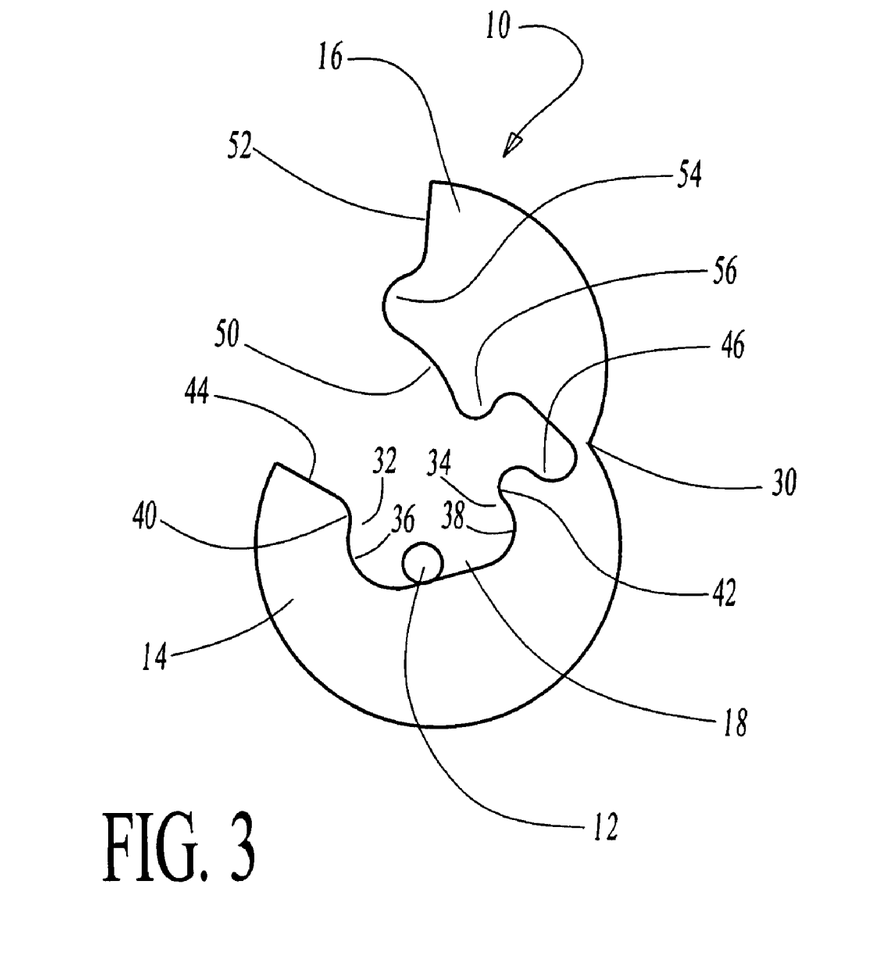
FIG. 3 is an end view of the bead of the type as shown in FIG. 1.
Figure 4:
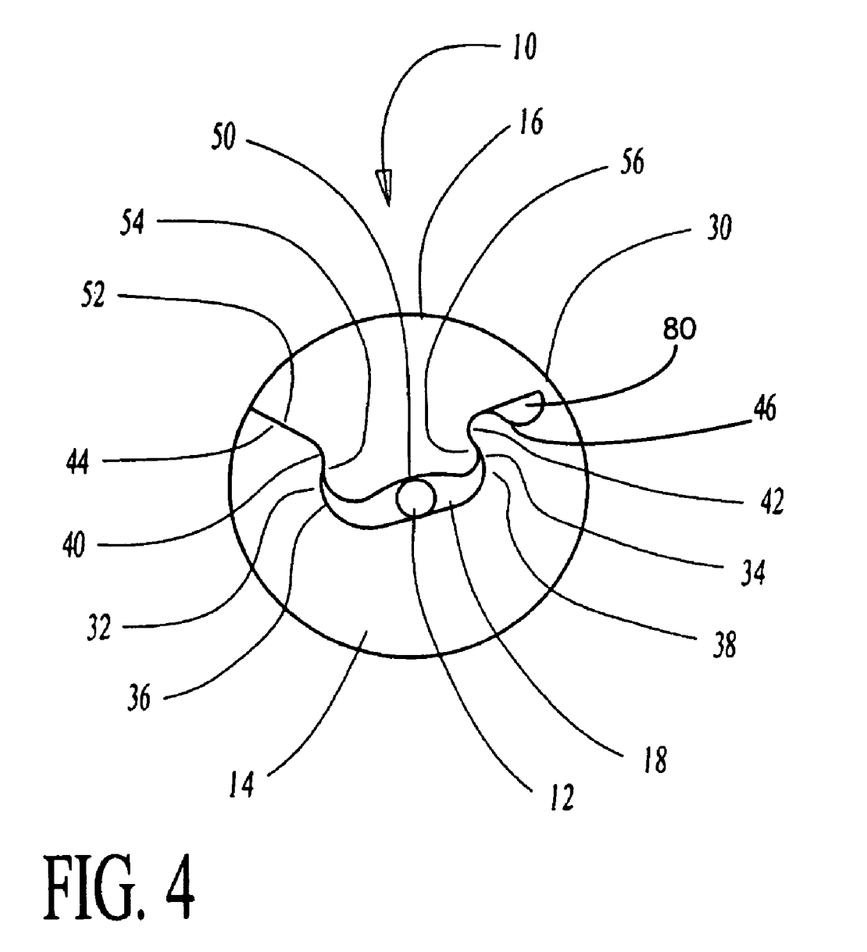
FIG. 4 is an end view of the bead of the type as shown in FIG. 2.

Referring next to FIGS. 3 and 4, the engagement and disengagement of the lid 16 to the main body 14 is shown in greater detail. The main body 14 and lid 16 are interconnected by a web or hinge 30. The hinge 30 aligns the lid 16 parallel to the main body 14 when it is snapped in place. The main body 14, lid 16 and hinge 30 are preferably made, without limitation, from a thermoplastic resin material. The channel 18 within a solid main body 14 is defined by first and second opposing walls 32 and 34. Concave grooves 36 and 38 are formed within each opposing wall that extends the length of the channel 18. First and second upper portions 40 and 42 of the opposing walls 32 and 34 are rounded to reduce friction as the lid 16 engages within the channel 18. The first upper portion 40 extends outwardly along an angle 44 to the outer surface of the bead 10. The second upper portion 42 extends outwardly along a continuous curvature 46 to the hinge 30.

The interior surface of the lid 16 is formed to include a wedge or protrusion 50 having sidewalls 54 and 56 and a shape congruent or mating with the channel 18 and grooves 36 and 38 when the lid 16 is closed on the main body 14. An outer width between the sidewalls 54 and 56 of protrusion 50 is greater than a distance between the first and second opposing walls 32 and 34. When the lid 16 is snapped together into the main body 14, the sidewalls 32 and 34 of the main body 14 slide over the side walls 54 and 56 of the lid 16. Further, when the lid 16 is snapped into the main body 14, an outer edge 52 of the lid 16 rests against or close to the angled surface 44 of first upper portion 40. When the outer edge 52 rests close to the angled surface 44 the outer surface of the bead 10 is smooth.

In use, when the lid 16 is closed on the main body 14, the material near an outer surface of the hinge 30 will stretch while the material near an inner surface of hinge 30 compresses. A gap 80 near the hinge 30, and between the lid 16 and main body 14, allows for the compression of the hinge 30 when the lid 16 is closed onto the main body 14. The outer portion of hinge 30 does not extend past the outer surface of bead 10, creating a flush outer shape when the lid 16 is closed.

Figure 5:
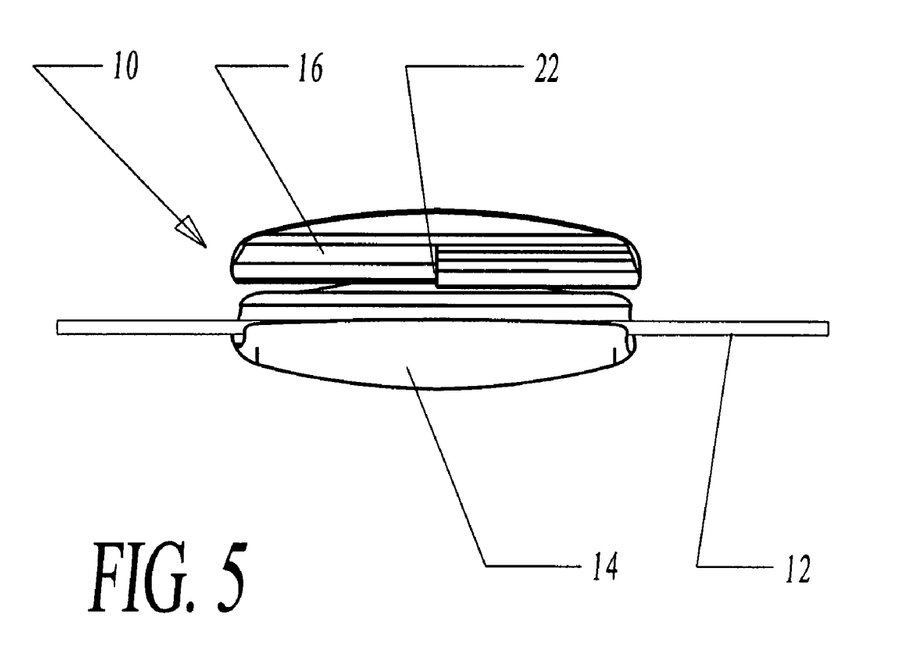
FIG. 5 is a side view of the bead of the type shown in FIG. 1.
Figure 6:
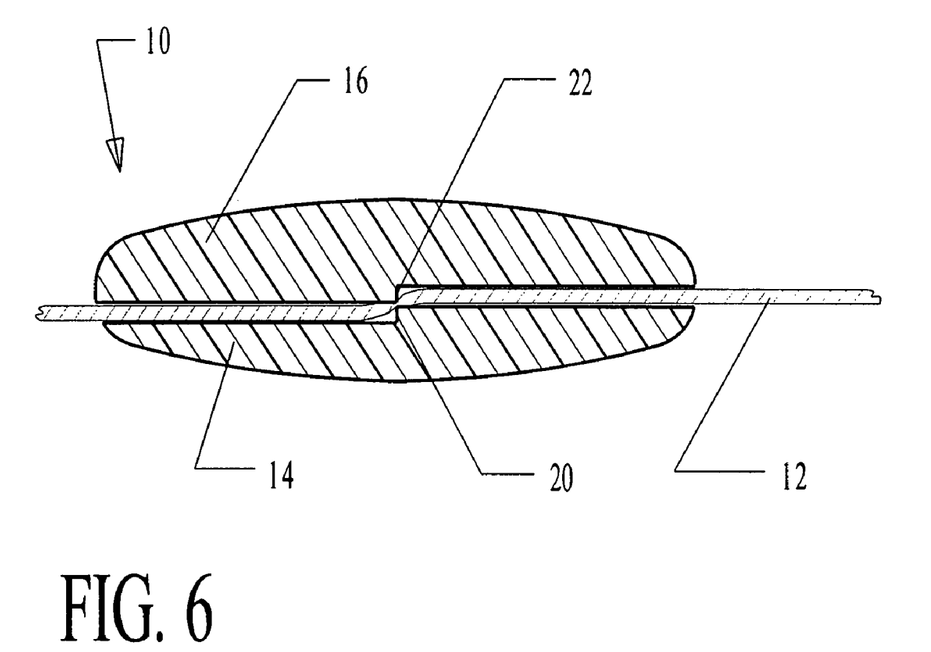
FIG. 6 is a sectional view of the bead of the type shown in FIG. 2.

Referring to FIGS. 5 and 6 the offset 20 in the channel 18 of the main body 14 and offset 22 in the lid 16 are shown. When the lid 16 is closed, this offset will pinch or crimp the string 12 preventing the string 12 from sliding within the bead 10. The offset may alternatively allow enough of a gap between lid 16 and main body 14 so that string 12 slides within the channel 18. The gap size may be varied so that when the lid 16 is closed varying tensions against the string 12 are achieved.

Figure 7:
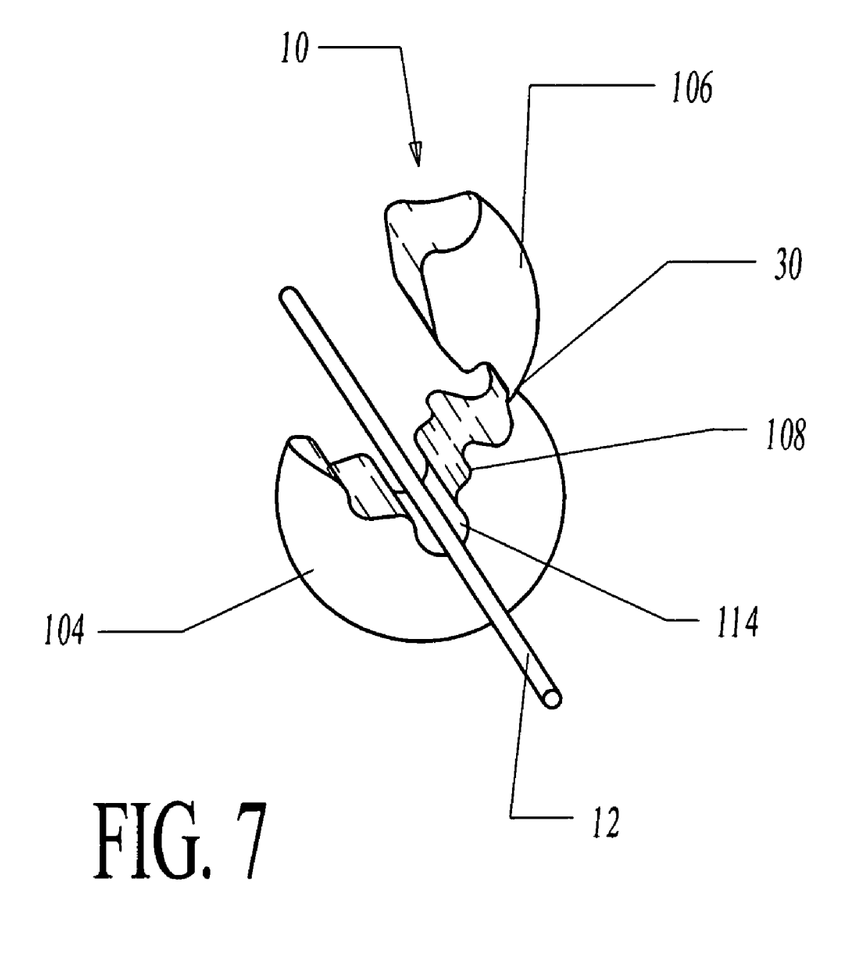
FIG. 7 is a perspective view of an alternate embodiment of the bead of the present invention having a cover shown in an open position.
Figure 8:
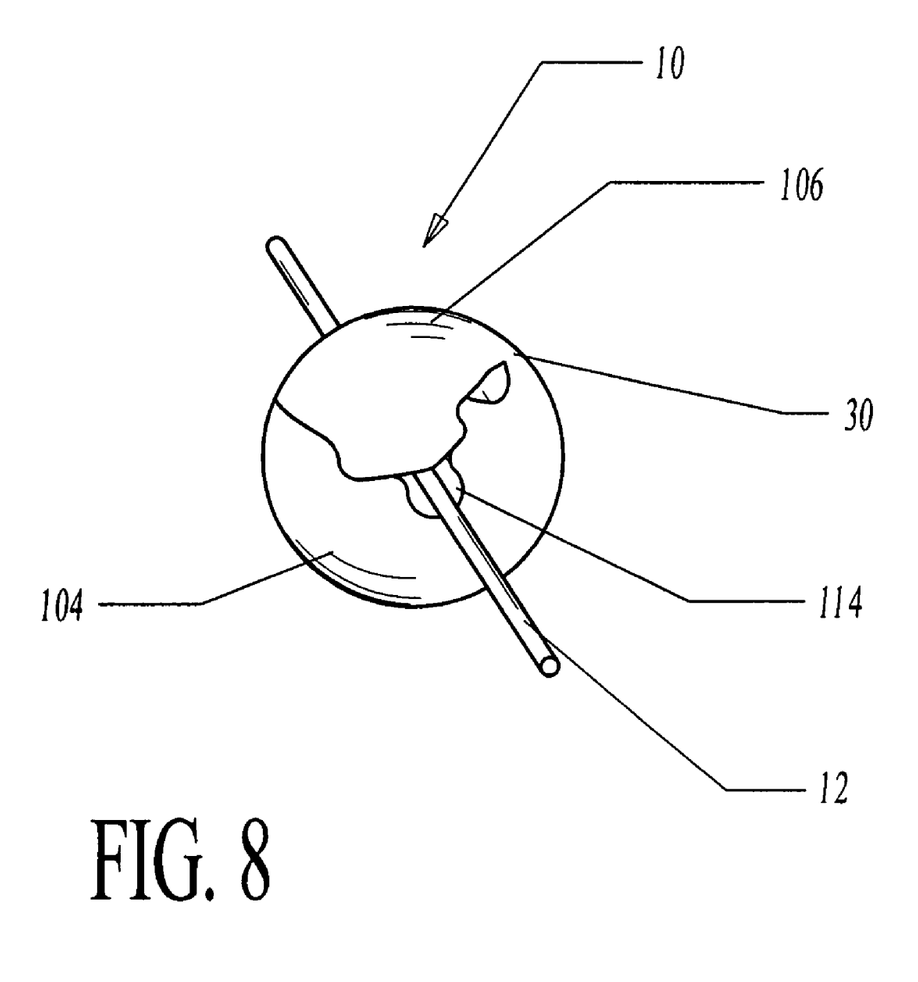
FIG. 8 is a perspective view of the bead of the type shown in FIG. 7 having the cover in a closed position.

Referring first to FIGS. 7 and 8, an alternative bead 10 of the present invention is shown having a string 12 positioned within the bead 10. The bead 10 includes a main body 104 and lid 106. A channel 108 is formed in the main body 104 of the bead 10. A recession 114 is formed in a lower portion of the channel 108 and is suitable for receiving the string 12 within the recession 114. The string 12 is cradled in the recession 114 such that when the lid 106 is closed on the main body 104, the longitudinal surface of the channel 108 and the longitudinal surface of the interior of the lid 16 press together to trap the string 12 in the recession 114 within the bead 10. Alternatively, the size of the recession 114 or string 12 may vary so that a surface of the lid 106 engages with a surface of the string 12. When the lid 106 is closed on the main body 104, the channel 108 is generally aligned with a central axis 108 of the bead 10, such that the bead 10 is equally balanced on the string 12 so that the bead 10 does not hang disproportionately on the string 12. Further, when the lid 106 is closed, the external surface of the bead 10 is generally smooth and without abrupt contours that easily catch or snag on adjacent objects. Although a spherical shape is shown, alternative shapes may equally apply.

Figure 9:
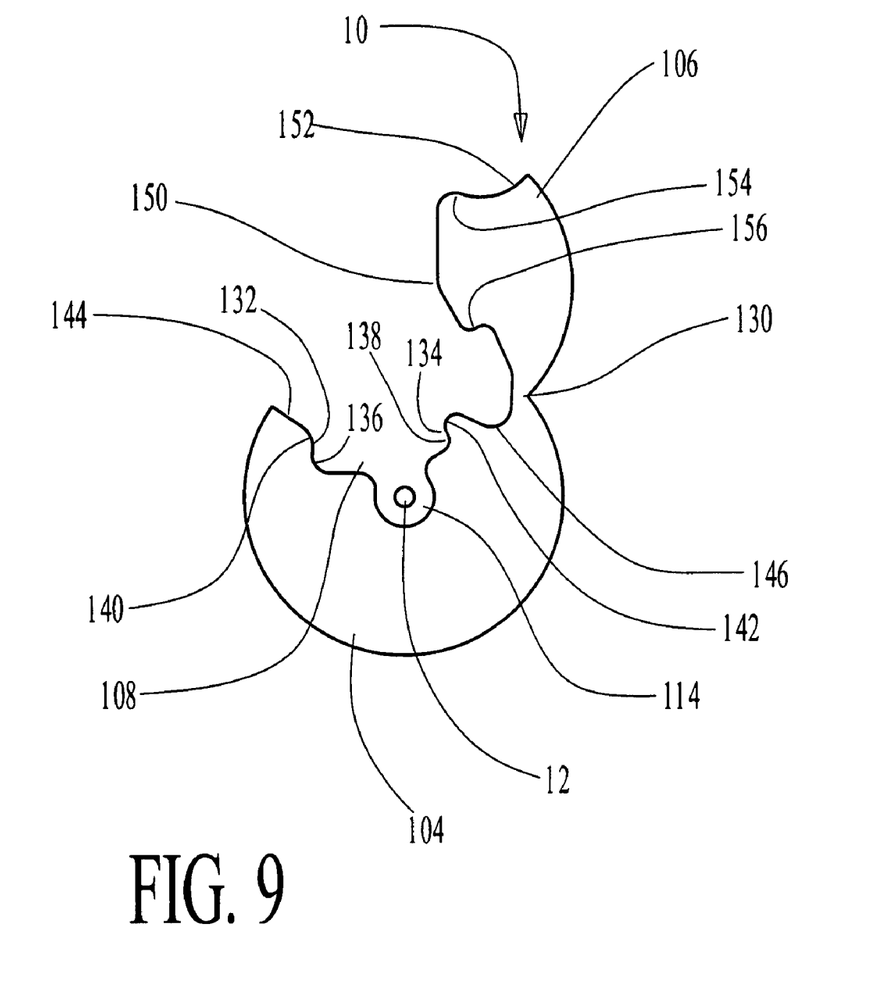
FIG. 9 is an end view of the bead of the type shown in FIG. 7 having the cover in the open position.
Figure 10:
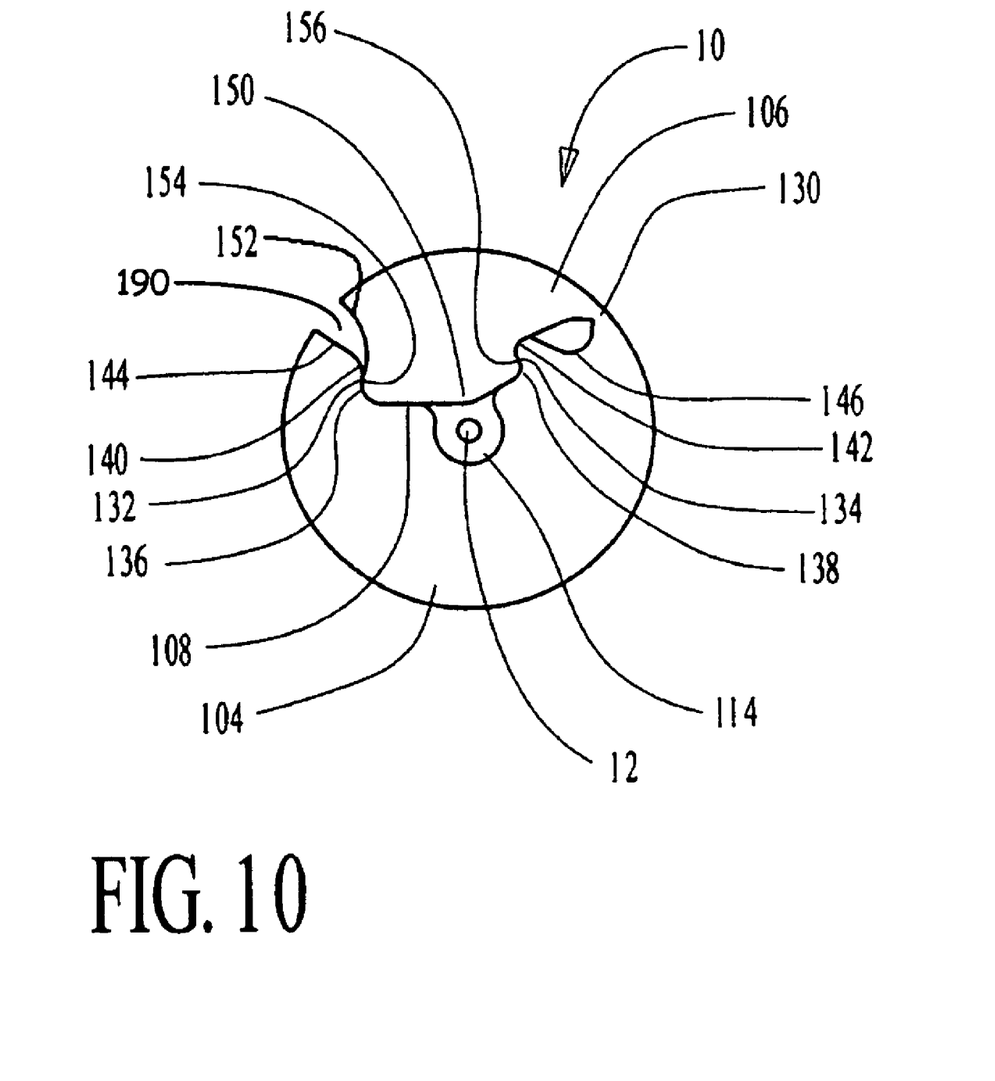
FIG. 10 is an end view of the bead of the type shown in FIG. 7 having the cover in the closed position.

Referring next to FIGS. 9 and 10, the engagement and disengagement of the lid 106 to the main body 104 is shown in greater detail. The main body 104 and lid 106 are interconnected by a web or hinge 130. The hinge 130 aligns the lid 106 parallel to the main body 104 when it is snapped in place. The main body 104, lid 106 and hinge 130 are preferably made, without limitation, from a thermoplastic resin material. The channel 108 within the main body 104 is defined by first and second opposing walls 132 and 134. Concave grooves 136 and 138 are formed within each opposing wall that extends the length of the channel 108. First and second upper portions 140 and 142 of the opposing walls 132 and 134 are rounded to reduce friction as the lid 106 engages within the channel 108. The first upper portion 140 extends outwardly along an angle 144 to the outer surface of the bead 10. The second upper portion 142 extends outwardly along a continuous curvature 146 to the hinge 130.

The interior surface of the lid 106 is formed to include a protrusion 150 having sidewalls 154 and 156 and a shape mating with the channel 108 and grooves 136 and 138 when the lid 106 is closed on the main body 104. An outer width between the sidewalls 154 and 156 of protrusion 150 is greater than a distance between the first and second opposing walls 132 and 134. When the lid 106 is snapped together into the main body 104 the sidewalls 132 and 134 of the main body 104 are forced to slide over the side walls 154 and 156 of the lid 106 snapping them together Further, when the lid 106 is snapped into the main body 104, an outer edge 152 of the lid 106 rests against or close to the angled surface 144 of first upper portion 140. The outer edge 152 rests flush to the angled surface 144 the outer surface of the bead 10 is smooth with no gap between surface 152 and surface 144. An optional enhancement of the design is to leave a gap 190 between surface 152 and 144 allowing for a sharp tool to be wedged into the gap and pry open the bead 10. This will allow the bead 10 to be removed and used again.

Figure 11:
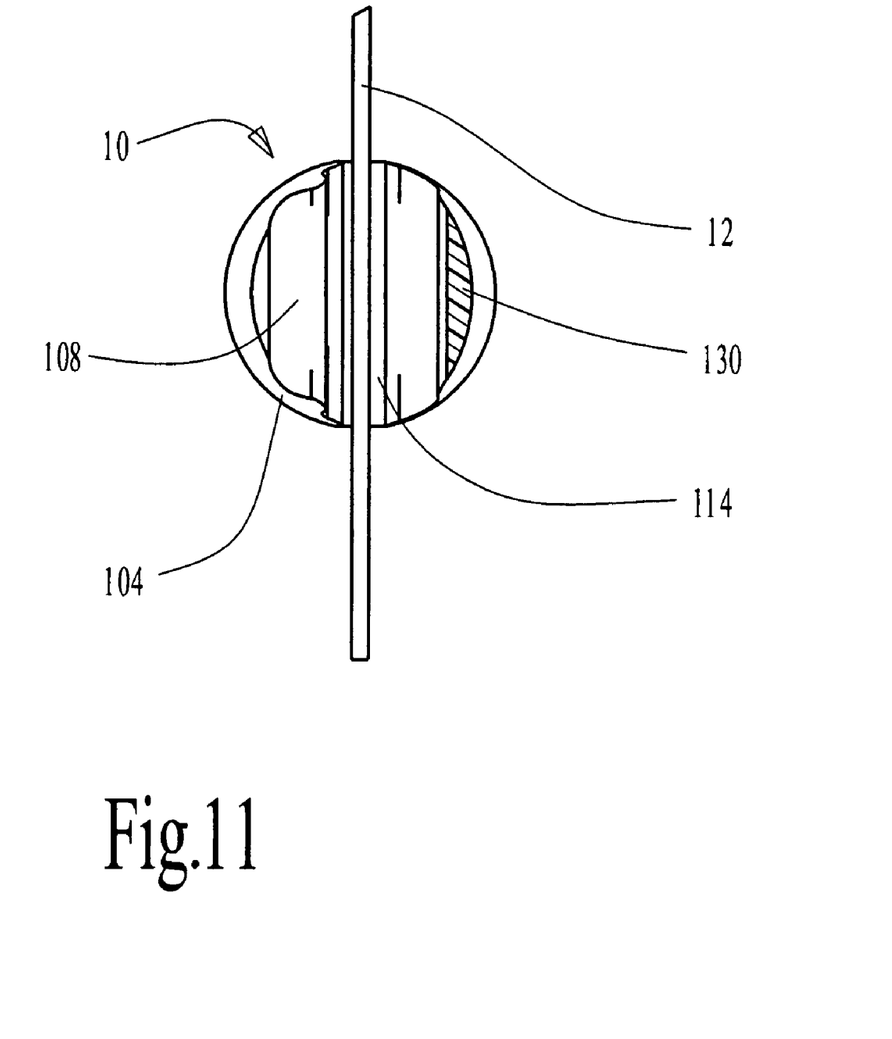
FIG. 11 is a top sectional view of the bead of the type shown in FIG. 9.

Referring to FIG. 11, the hinge 130 is shown with an outside surface of the hinge congruent with an outer surface of the bead 10 and an inner surface of the hinge forming a planar interior parallel with channel 108. When the lid 106 is closed on the main body 104, the material near an outer surface of the hinge 130 will stretch while the material near an inner surface of hinge 130 compresses. A gap near the hinge 130, and between the lid 106 and main body 104, allows for the compression of the hinge 130 when the lid 106 is closed onto the main body 104. The hinge 130 does not extend past the outer surface of bead 10, creating a flush outer shape when the lid 106 is closed.

This invention has been described herein in considerable detail in order to comply with the patent statutes and to provide those skilled in the art with the information needed to apply the novel principles and to construct and use such specialized components as are required. However, it is to be understood that the invention can be carried out by specifically different constructions, and that various modifications, both as to the construction and operating procedures, can be accomplished without departing from the scope of the invention itself.

What is claimed is:

1. A fishing line stop comprising:
  a main body having a channel extending both generally parallel to a longitudinal axis of the main body and into the main body from an outer surface of the main body, a first end of the channel that extends into the main body at a first outer portion of the main body and a second end of the channel that extends into the main body at a second outer portion of the main body, the channel including a first opposing sidewall and a second opposing sidewall, each of the opposing sidewalls having a lower portion and an upper portion, each of the lower portions of the opposing sidewalls having a concave groove extending along a length of the channel, each of the upper portions of the opposing sidewalls being curved going from an inner portion of the channel to the outer surface of the main body, the channel having widths perpendicular to a length of the channel, a width of the channel at a bottom portion of the channel being greater than a width of the channel at an upper portion of the channel, the channel including a channel offset that extends transverse to the length of the channel and divides the channel into a first portion and a second portion, the first and the second portions each having a depth which is different from the depth of the other, the first portion extending from the channel offset to the first outer portion of the main body and the second portion extending from the channel offset to the second outer portion of the main body;
  a lid including a wedge extending from a top portion of the lid, wherein a shape of a portion of the wedge and the concave grooves of the main body are congruent such that when the lid is aligned and engaged with the main body, the wedge engages with the main body in a portion of the channel, wherein the wedge includes a first sidewall and a second sidewall, the wedge first and second sidewalls extending along a length of the lid and having curved features at a bottom portion of the wedge that is furthest extended away from the top portion of the lid, wherein an outer width of the bottom portion of the wedge is greater than the width of the channel at the upper portion of the channel and is less than the width of the channel at the bottom portion of the channel, the lid including lid offset that divides the wedge into a wedge first portion and a wedge second portion, the first and the second portions of the wedge each having a height which is different from the height of the other;
  a flexible hinge interconnecting the lid to the main body, the flexible hinge having a pivot axis that is aligned in parallel to the channel;
  a gap that runs along the length of the channel and that is located between the main body, the lid, and the flexible hinge; and
  wherein the main body, the lid, and the flexible hinge form a smooth continuous outer surface of the fishing line stop.

2. The fishing line stop according to claim 1, wherein said wedge interlocks with said channel when said wedge is engaged with the main body, and wherein the channel is positioned within a central axis of the fishing line stop.

3. The fishing line stop according to claim 2, wherein a fishing line is positioned within the fishing line stop, and wherein the lid offset and the channel offset prevent the fishing line stop from sliding along the fishing line.

4. The fishing line stop according to claim 2, wherein a fishing line is positioned within the fishing line stop, and wherein the lid offset and the channel offset allow the fishing line stop to slide along the fishing line.

5. The fishing line stop according to claim 3, wherein the upper portion of the channel first opposing sidewall extends outwardly at an angle to the outer surface of the main body and the upper portion of the channel second opposing sidewall extends outwardly along a continuous curvature to the flexible hinge.

6. The fishing line stop according to claim 5, wherein an outermost width of the fishing line stop does not exceed 0.250 inch, wherein the fishing line stop and the fishing line are utilized in connection with a fishing pole, the fishing pole having eye loops and a fishing reel, and wherein the fishing line stop is reeled up and passed through the eye loops and onto the fishing reel.

7. The fishing line stop according to claim 5, wherein the main body, the lid, and the flexible hinge are made of a thermoplastic resin material.

8. The fishing line stop according to claim 7, wherein the channel offset and the lid offset create an area of reduced distance between the main body and the wedge.

9. The fishing line stop according to claim 7, wherein the wedge is engaged with the main body and wherein the lid and the main body form a continuous smooth rounded outer surface that is less than 0.250 inch when the main body and the lid are aligned and engaged in a closed position.

10. The fishing line stop according to claim 7, wherein the smooth continuous outer surface of the fishing line stop is interrupted by a second gap, the second gap being between an outer edge of the lid and the upper portion of the channel first opposing sidewall, the second gap extending along the length of the channel when the main body and the lid are aligned and engaged in a closed position.

11. A device comprising:

a main body having a channel extending into the main body toward a central axis of the main body, and extending through the main body between a first outer surface and a second outer surface of the main body, the channel including a first opposing sidewall, a second opposing sidewall, and a bottom wall, each of the first opposing sidewall, the second opposing sidewall, and the bottom wall running along an entire length of the main body in a direction at least approximately parallel to the central axis of the main body, the bottom wall including two surfaces having depths within the device which are different from each other, the two surfaces separated by a channel dividing line that extends at least approximately perpendicular to the central axis of the main body, each of the two surfaces extending from the channel dividing line to a respective one of the first and second outer surfaces of the main body, the first and the second opposing sidewalls having concave shapes, the channel having a lower portion, a middle portion, and an upper portion, the lower portion being closest to the bottom wall and the upper portion being furthest away from the bottom wall, the middle portion being between the lower portion and the upper portion, each of the lower, the middle, and the upper portions having a width, wherein the width of the middle portion is greater than the width of the upper and lower portions;

a lid including a wedge extending there from, wherein the main body receives a portion of the wedge in the channel, and wherein the wedge engages with the main body in said channel when the main body and the lid are aligned and engaged in a closed position, and wherein the wedge interlocks with said channel when said wedge is engaged with the main body, the wedge having a first sidewall, a second sidewall, and a bottom wall, each of the first sidewall, the second sidewall, and the bottom wall running along the entire length of the main body in the direction that is at least approximately parallel to the central axis of the main body, the bottom wall running between and connecting the first sidewall and the second sidewall, the first sidewall having a shape that is congruent with the concave shape of the channel first opposing sidewall, the second sidewall having a shape that is congruent with the concave shape of the channel second opposing sidewall, the wedge having a lower portion, a middle portion, and an upper portion, wherein when the wedge is engaged with the channel the wedge lower portion is closest to the channel bottom wall and the wedge upper portion is furthest away from the channel bottom wall and the wedge middle portion is between the wedge lower and upper portions, each of the wedge lower portion, the wedge middle portion, and the wedge upper portion having a width, wherein the width of the wedge middle portion is greater than the widths of the wedge lower and upper portions, wherein the channel middle portion is adjacent to the wedge middle portion when the wedge is engaged with the channel;

a flexible hinge interconnecting the lid to the main body, the flexible hinge having a pivot axis that is at least approximately parallel to the central axis of the main body, the flexible hinge and the pivot axis running along the entire length of the main body, wherein the flexible hinge allows for the lid to be rotated about the pivot axis towards and away from the main body; and a gap that is adjacent to the flexible hinge and that is between the lid and the main body, the gap running along the entire length of the main body in a direction that is at least approximately parallel to the central axis of the main body.

12. The device according to claim 11, wherein an outermost width of said device does not exceed 0.250 inch, and wherein the gap is parallel to the channel.

13. The device according to claim 12, wherein said device is a fishing line stop, wherein said device has an elliptical shape, and wherein the wedge bottom wall includes two surfaces having depths which are different from each other within the device, the two surfaces of the wedge being separated by a wedge dividing line that is at least approximately perpendicular to the central axis of the main body.

14. The device according to claim 13, wherein the channel dividing line is aligned with the wedge dividing line such that one of the two channel bottom wall surfaces opposes one of the two wedge bottom wall surfaces and that another one of the channel bottom wall surfaces opposes another one of the two wedge bottom wall surfaces, and wherein the channel and the wedge surfaces and dividing lines form a stair-step offset in said channel that limits or restricts movement of a string in said channel.

15. The device according to claim 11, wherein an inner surface of said hinge forms a planar surface parallel to the channel, the planar surface extending along the main body central axis, wherein a shape of an outer surface of said hinge is congruent with a shape of an adjacent surface of said device such that the hinge outer surface and the adjacent surface form an uninterrupted curved surface, wherein the device is made entirely of a thermoplastic resin material, and wherein the uninterrupted curved surface is less than 0.250 inch.

* * * * *